(12) United States Patent
Suzuki et al.

(10) Patent No.: US 10,962,987 B2
(45) Date of Patent: Mar. 30, 2021

(54) GROUP ROBOT AND COLLECTIVE MOVEMENT CONTROLLING METHOD FOR GROUP ROBOT

(71) Applicants: TOKYO DENKI UNIVERSITY, Tokyo (JP); KOGANEI CORPORATION, Tokyo (JP)

(72) Inventors: Tsuyoshi Suzuki, Tokyo (JP); Kouhei Yamagishi, Tokyo (JP)

(73) Assignees: TOKYO DENKI UNIVERSITY, Tokyo (JP); KOGANEI CORPORATION, Tokyo (JP)

( * ) Notice: Subject to any disclaimer, the term of this patent is extended or adjusted under 35 U.S.C. 154(b) by 233 days.

(21) Appl. No.: 16/307,447

(22) PCT Filed: May 31, 2017

(86) PCT No.: PCT/JP2017/020171
§ 371 (c)(1),
(2) Date: Dec. 5, 2018

(87) PCT Pub. No.: WO2017/212987
PCT Pub. Date: Dec. 14, 2017

(65) Prior Publication Data
US 2019/0310656 A1 Oct. 10, 2019

(30) Foreign Application Priority Data
Jun. 6, 2016 (JP) .............................. JP2016-113085

(51) Int. Cl.
*G05D 1/00* (2006.01)
*G05D 1/02* (2020.01)
(Continued)

(52) U.S. Cl.
CPC .......... *G05D 1/0295* (2013.01); *B25J 9/1682* (2013.01); *B25J 13/00* (2013.01);
(Continued)

(58) Field of Classification Search
CPC ....... G05S 1/0295; B25J 9/1682; B25J 13/00; G05D 1/0027; G05D 1/02; G06N 7/00
See application file for complete search history.

(56) References Cited

U.S. PATENT DOCUMENTS 9,131,529 B1* 9/2015 Ayyagari .............. H04W 84/06
2017/0068243 A1* 3/2017 MacCready ......... G05D 1/0206

FOREIGN PATENT DOCUMENTS

JP 2015-201068 A 11/2015

OTHER PUBLICATIONS

D'Angelo, Antonio, Tetsuro Funato, and Enrico Pagello. "Motion control of dense robot colony using thermodynamics." Distributed Autonomous Robotic Systems 8. Springer, Berlin, Heidelberg, 2009. 85-96. (Year: 2009).*

* cited by examiner

*Primary Examiner* — Dale Moyer
(74) *Attorney, Agent, or Firm* — Birch, Stewart, Kolasch & Birch, LLP.

(57) ABSTRACT

A group robot and a method for controlling a collective movement of a group robot that realize a combination of autonomous distributed control and centralized control according to the environment are provided. A group robot is formed of at least two robots that have powers and autonomously move obtains mutual position information among the robots and with respect to an object that exists in a movable area of the robots, presets a virtual object temperature for the object and a virtual initial robot temperature that is lower than the virtual object temperature for the robot, calculates a virtual robot temperature, which changed by a virtual heat transfer, from the virtual object temperature, the virtual initial robot temperature, and a distance between the robot and the object, calculates virtual attractive-repulsive force from a distance between the robots to keep the distance (Continued)

between the robots and virtual repulsive force acting between the object and the robot from a virtual robot temperature by using a thermodynamics mathematical model, and controls a movement direction and velocity of the robot by using a sum of the virtual attractive-repulsive force and the virtual repulsive force.

11 Claims, 5 Drawing Sheets

(51) Int. Cl.
  *B25J 9/16* (2006.01)
  *G06N 7/00* (2006.01)
  *B25J 13/00* (2006.01)
(52) U.S. Cl.
  CPC ............ *G05D 1/0027* (2013.01); *G05D 1/02* (2013.01); *G06N 7/00* (2013.01)

FIG.4
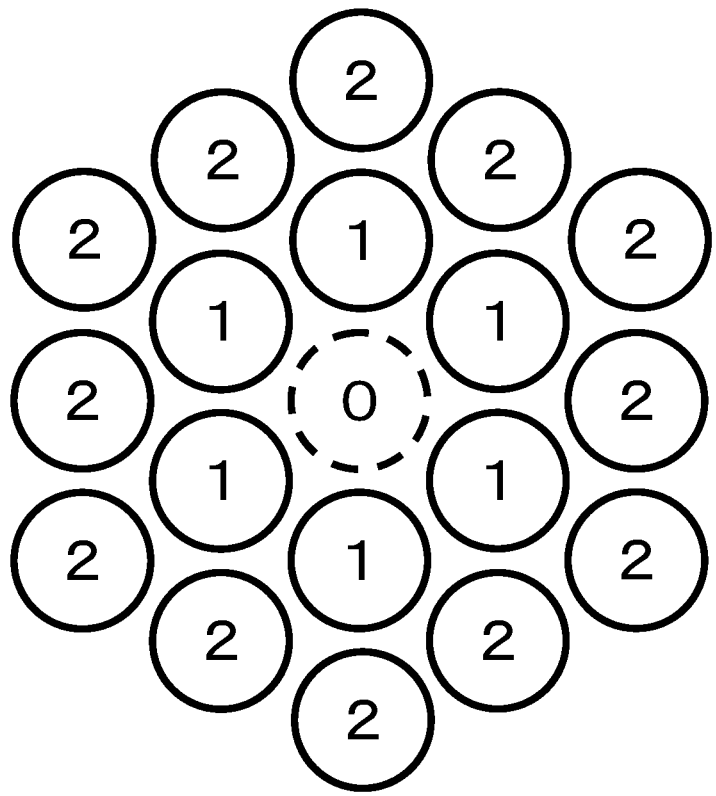
FIG.5
(A)
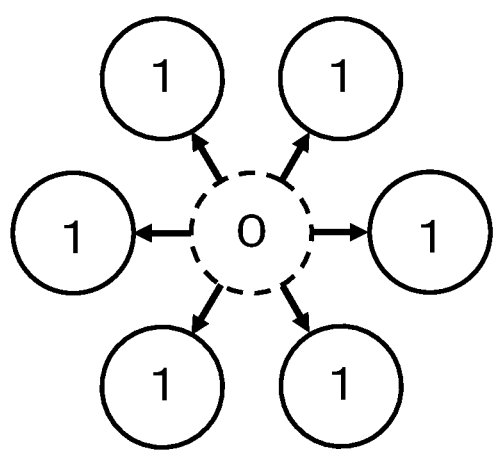
(B)
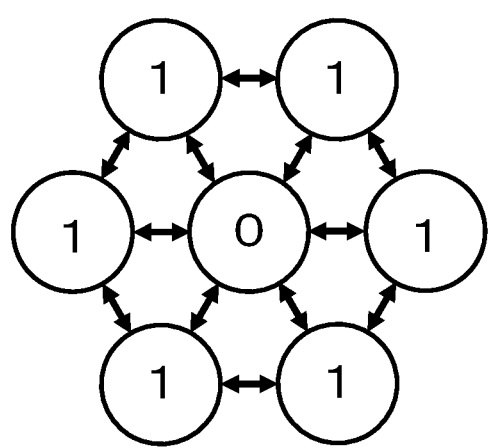

GROUP ROBOT AND COLLECTIVE MOVEMENT CONTROLLING METHOD FOR GROUP ROBOT

TECHNICAL FIELD

The present invention relates to a group robot formed by a number of robots to work as a group, and specifically relates to a control system for a collective movement of a group robot.

BACKGROUND ART

A multi-robot system formed by a number of robots to work as a group is expected to have many applications such as transportation of objects, monitoring of construction sites and the like by using the property as a group and an individual.

In order to realize the multi-robot system, it is necessary to have a control system that had been fully considered its routes, existence of objects, width of its routes and the like in operation environments.

For example, a method in which state variables of only one robot constitute MARCOV state space used for machine learning (see patent literature 1), a method for regulating relationship between robots that constitute a group robot (see patent literature 2 and nonpatent literature 1), a method for controlling a multi-robot movement by using a method that incorporates molecular dynamics method and hydrodynamic property into a robot movement, and the like had been proposed.

CITATION LIST

Patent Literature

[Patent Literature 1] Japanese Patent Laid-Open No. 2015-201068
[Patent Literature 2] Japanese Patent Laid-Open No. 2007-242056

Nonpatent Literature

[Nonpatent Literature 1] Michael Rubinstein, Christian Ahler, Nick Hoff, Adiran Cabrera, Radhika Nagpal, "Kilobot: A low cost robot with scalable operations designed for collective behaviors", Robotics and Autonomous Systems 62(2014)966-975. Journal homepage: www.elsevier.com/locate/robot
[Nonpatent Literature 2] Masahiro Shimizu, Toshihiro Kawakatsu, Akio Ishiguro "Coherent Swarming through the Local Interaction by Exploiting Simulation Techniques for Many Particle Systems", Transactions of the Society of Instrument and Control Engineers, Vol. 41, No. 2, 126/134 (2005)

SUMMARY OF INVENTION

Technical Problem

However, the technology described in patent literatures 1 and 2 and nonpatent literature 1 are controlling methods respectively having a characteristic in formation or sensing. Thus, if a centralized control section breaks down, it may be difficult to control the entire system.

On the other hand, the technology described in nonpatent literatures 2 makes it possible to control with a low calculation load and can be a preferable control method. However, it has a problem in which it is difficult to control a group that has a strong connection among robots.

It is thus an object of the present invention, which has been achieved for addressing the above-mentioned problems of the back ground, to provide a group robot and a method for controlling a collective movement of a group robot that realize a combination of autonomous distributed control and centralized control according to the environment.

Solution to Problem

An embodiment of the present invention is a multi-robot system comprising at least two robots that have powers and autonomously move.

Each of the robots includes a measurement section for obtaining mutual position information among the robots and an object that exists in a movable area of the robots, a communication section for exchanging the information among the robots, and a control section for moving the robot on the basis of the information.

The control section presets a virtual object temperature for the object and a virtual initial robot temperature that is lower than the virtual object temperature for the robot, calculates a virtual robot temperature, which changed by a virtual heat transfer, from the virtual object temperature, the virtual initial robot temperature, and a distance between the robot and the object, calculate virtual attractive-repulsive force from a distance between the robots to keep the distance between the robots and virtual repulsive force acting between the object and the robot from a virtual robot temperature by using a thermodynamics mathematical model, and controls a movement direction and velocity of the robot by using a sum of the virtual attractive-repulsive force and the virtual repulsive force to resolve the above-mentioned problems.

Also, in the above-mentioned embodiment, the robot has a cylindrical body with a diameter σ, and the sum is expressed by a thermodynamics mathematical model of a formula (1), the attractive-repulsive force is indicated by the first term on the right side of the formula (1), and the repulsive force is indicated by the second term on the right side of the formula (1) to further resolve the above-mentioned problems.

formula (1)

$$Q_i(r_{ij}, T_{il}(r_{il}, t)) = \sum_{j \in RS} \beta \varepsilon \left\{ \left(\frac{\sigma}{r_{ij}}\right)^A - \left(\frac{\sigma}{r_{ij}}\right)^B \right\} + \frac{T_i(r_{ij}, t)^2}{2} \quad (1)$$

where:
subscript l is an object, subscript i is an ith robot, subscript j is a jth robot,
Q is a sum, r is a distance, t is time, β is an attractive-repulsive force adjustment parameter,
ε is an attractive-repulsive force maximum value adjustment parameter, T is a virtual temperature,
A is a repulsive force strength parameter, B is an attractive force strength parameter, and
RS is an assembly of robots that can exchange information.

Furthermore, in the above-mentioned embodiment, the virtual heat transfer is expressed by a formula (2) to further resolve the above-mentioned problems.

formula (2)

$$T_i(r_{il}, t) = \int_{dt}^{\infty} -k\left\{T_i(r_{il}, t-dt) - \frac{\sum_{l \in OS} T(r_{il})}{|OS|}\right\} dt + T_0 \quad (2)$$

where:
subscript l is an object, k is a virtual heat transfer coefficient, OS is an assembly of objects that exist in a movable area of the robot, T0 is a virtual initial robot temperature.

Furthermore, in the above-mentioned embodiment, when the virtual robot temperature exceeds a preset virtual transition temperature, the object and the robot form a virtual liquid phase to further resolve the above-mentioned problems.

Furthermore, in the above-mentioned embodiment, the virtual transition temperature is expressed by a ratio of the diameter σ of the robot and a distance $r_{il}$, and the virtual liquid phase has temperature distribution indicated in a formula (3) between the robot and the object to further resolve the above-mentioned problems.

formula (3)

$$T(r_{il}) = -2\left(\frac{T_i}{\sigma} r_{il} + T_l\right) \quad (3)$$

Another embodiment of the present invention is a method for controlling a collective movement of a group robot formed by a plurality of the robots.

At least one of the robots that forms the group robot is assigned as one or more leader robots and the one or more other robots are assigned as one or more follower robots, the leader robots and the follower robots can communicate with each other, and an instruction from the leader robots to the follower robots makes the follower robots follow the leader robots to resolve the above-mentioned problems.

Furthermore, in the above-mentioned embodiment, each of the robots is assigned with an identification number N. The leader robots are assigned with 0 as the identification numbers N, and a plurality of the follower robots is assigned with numbers that are calculated according to a formula (4) as the identification number N of each. With the assigned identification number N, a thermodynamics mathematical model expressing the sum of the follower robots is expressed by formulas (5) and (6) to further resolve the above-mentioned problems.

formula (4)

$$N_i = \min(N_j \mid j \in RS) + 1 \quad (4)$$

formula (5)

$$Q'_i(r_{ij}, T_i(r_{il}, t), \delta(N_i, N_j)) = \quad (5)$$
$$\sum_{j \in RS} \delta(N_i, N_j) \beta \varepsilon \left\{\left(\frac{\sigma}{r_{ij}}\right)^A - \left(\frac{\sigma}{r_{ij}}\right)^B\right\} + \frac{T_i(r_{ij}, t)^2}{2}$$

formula (6)

$$\delta(N_i, N_j) = \begin{cases} P_r; & N_i = N_j + 1 \\ 1; & N_i = N_j \quad ; \quad P_r \geq 1 \geq P_w > 0 \\ P_w; & \text{else} \end{cases} \quad (6)$$

Advantageous Effects of Invention

According to a group robot in the present invention comprising at least two robots that have powers and autonomously move, because each of the robots includes a measurement section for obtaining mutual position information among the robots and an object that exists in a movable area of the robots, a communication section for exchanging the information among the robots, and a control section for moving the robot on the basis of the information, it is possible to provide a group robot and a method for controlling a collective movement of a group robot that realize a combination of autonomous distributed control and centralized control according to the environment, and it is possible to achieve the following unique effects of the present invention.

According to an embodiment of the present invention, because the control section presets a virtual object temperature for the object and a virtual initial robot temperature that is lower than the virtual object temperature for the robot, calculates a virtual robot temperature, which changed by a virtual heat transfer, from the virtual object temperature, the virtual initial robot temperature, and a distance between the robot and the object, calculates virtual attractive-repulsive force from a distance between the robots to keep the distance between the robots and virtual repulsive force acting between the object and the robot from a virtual robot temperature by using a thermodynamics mathematical model, and controls a movement direction and velocity of the robot by using a sum of the virtual attractive-repulsive force and the virtual repulsive force, it is possible to apply the thermodynamics model to control of a group robot.

In other words, if a robot is supposed to be a virtual molecule, energy that each molecule potentially has is potential acting between the molecules. This potential gathers each molecule to form a group and works as attractive force or repulsive force, which is referred to as attractive-repulsive force, to keep a constant distance between molecules. On the other hand, heat transferred from outside becomes heat energy to change a state of molecules. This heat energy works as repulsive force to make a molecule, which is supposed to be a robot, leave away from another molecule, which is supposed to be an obstacle. Specifically, the repulsive force is force acting in a vertical direction against a surface of the obstacle.

The thermodynamics mathematical model of this phenomenon is expressed by a formula (7), where W is energy that each molecule potentially has, φ (r) is potential acting between molecules (Lennard-Jones potential), and K(T) is heat energy transferred from outside (Brownian motion).

formula (7)

$$W = \phi(r) + K(T) \quad (7)$$

As mentioned above, if the robot is supposed to be a virtual molecule, the first term on the right side of the formula (7) is potential φ (r) that works as attractive-repulsive force acting between molecules, and the second term on the right side of the formula (7) is heat energy K(T) that is transferred from outside and works as repulsive force to separate an object (an obstacle) and a molecule. The heat energy K(T) is virtual heat energy calculated from the virtual robot temperature. And the thermodynamics mathematical model is a sum of the virtual attractive-repulsive force and the virtual repulsive force. This supposition makes it possible to easily calculate a relationship between robots to control the movement direction and the velocity of each robot. In other words, according to the gratitude of the attractive-repulsive force and the repulsive force, it allows the robot to determine to move as a group or move autonomously.

Such a robot movement makes it possible to realize a collective movement of a group robot with a low calculation load, and in case that an obstacle exists, it is possible to allow only the robot under an influence of the obstacle to avoid the obstacle. Thus, it is possible to achieve an effect in which partial centralized control and partial distributed control can be accordingly and autonomously selected.

More specifically, this makes it possible to autonomously change a formation of the group robot by changing a state of the group robot between a strongly connected state among robots (highly attractive state) and a flexible state (highly repulsive and lowly attractive state).

Also, in the above-mentioned embodiment, the robot has a cylindrical body with a diameter σ, the sum is expressed by a thermodynamics mathematical model of the formula (1), the attractive-repulsive force is indicated by the first term on the right side of the formula (1), and the repulsive force is indicated by the second term on the right side of the formula (1). Thus, a movement of a robot can be controlled by expressing the virtual intermolecular force and the virtual heat energy by only distances between robots and distances between a robot and the obstacle (an object). This makes it possible to minimize physical quantity to be observed and to realize a group robot control with a low calculation load.

Furthermore, in the above-mentioned embodiment, a movement of heat transfer is described by the formula (2) that expresses the virtual heat transfer. This makes it possible to uniquely calculate the virtual robot temperature from preset virtual initial temperatures of the robot and the obstacles (the object) and an observed distance between the robot and the obstacles. By using this calculated virtual temperature, the sum of the attractive force and the repulsive force of robots can be easily calculated with a thermodynamics mathematical model. Thus, in this embodiment, complex control is unnecessary because a robot movement can be controlled by only using a distance between the robots and a distance between the robot and the obstacle.

Furthermore, in the above-mentioned embodiment, when the virtual robot temperature exceeds a preset virtual transition temperature, the object and the robot form a virtual liquid phase. This largely and discontinuously increases the virtual robot temperature of a robot that approaches an obstacle (an object) and increases the heat energy transferred from outside. Thus, the attractive force between robots relatively decreases, and the repulsive force between the robots and the obstacle relatively increases. This achieves an effect that the strong connection between robots can be partially weakened so that connections for a robot approaching the obstacle is decreased to allow the group robot to avoid the obstacle.

There are three phases in a substance: a solid phase, a liquid phase, and a gaseous phase. And according to the temperature, a phase transition occurs from the solid phase to the liquid phase, from the liquid phase to the gaseous phase or in their reverse direction. In this embodiment, this phase transition is expressed by presetting virtual phase transition temperatures.

In other words, a strongly connected state between robots expresses a solid phase. Thus, a group with a constant formation as a group robot can be formed.

On the other hand, when some robots that form the group robot approach the obstacle and the temperature of them exceeds the virtual phase transition temperature because of exchanging the virtual heat energy, the robot and the obstacle change to a liquid phase.

By being a liquid phase, heat quantity transferred from the obstacle to the robot increase. This increases the virtual robot temperature and the heat energy in the second term on right side of the formula (1). The increased heat energy increases the repulsive force acting between the robot and the obstacle so that the robot avoids the obstacle.

Also, because the attractive force between the robot and surrounding robots relatively decreases, strong connection between robots is weakened. Thus, the group robot has a flexible and various formation according to the environment while moving as a group.

As described above, according to this embodiment, a collective movement of a group robot can be realized with a low calculation load by applying a thermodynamics concept of phase transition to a group robot. Furthermore, if an obstacle exists, only a robot that is under influence of the obstacle can avoid the obstacle.

Thus, it is possible to achieve an effect in which partial centralized control and partial distributed control can be accordingly and autonomously selected.

Furthermore, in the above-mentioned embodiment, the virtual transition temperature is expressed by a ratio of the diameter 6 of the robot and a distance $r_{ij}$, and the virtual liquid phase has temperature distribution indicated in the formula (3) between the robot and the object. This makes it possible to express a phenomenon of the virtual phase transition by a relationship between the robot ant the obstacle so that the group robot can certainly avoid the obstacle.

According to a method for controlling a collective movement of a group robot that is formed by a plurality of the robots in the present invention, at least one of the robots that forms the group robot is assigned as one or more leader robots and the one or more other robots are assigned as one or more follower robots, the leader robots and the follower robots can communicate with each other, and an instruction from the leader robots to the follower robots makes the follower robots follow the leader robots. This makes it possible to control the movement of a group robot including follower robots by instructing a destination or a route only to the leader robot. This achieves an effect to realize a collective movement of a group robot with a low calculation load.

About a mutual communication between robots, communication may be configured to be performed only between a leader robot and nearby follower robots and between nearby follower robots so that the entire group robot can be moved only by observation (of distances and time) of nearby robots with a distance sensor and by local communication (based on the identification numbers assigned to each robot).

Because the above-mentioned configuration can avoid a communication band suppression that happens in case of successive communication among all robots, reliability of communicated instruction can be increased and communication function with high performance is not necessary. Thus, it is possible to realize group robot control that contributes to cost reduction.

Furthermore, in the above-mentioned embodiment, each of the robots is assigned with an identification number N. The leader robots are assigned with 0 as the identification numbers N, and a plurality of the follower robots is assigned with numbers that are calculated according to a formula (4) as the identification number N of each. With the assigned identification number N, a thermodynamics mathematical model expressing the sum of the follower robots is expressed by the formulas (5) and (6). This makes it possible to assign numbers so that the leader robots are assigned with numbers as center robots and the follower robots are assigned with numbers according to distances from the leader robot.

In other word, a hierarchical instruction system from the leader robots to follower robots can be realized. This achieves an effect that when the originally assigned leader robot breaks down, a new leader robot can easily be assigned.

BRIEF DESCRIPTION OF DRAWINGS

FIG. 4 is an explanatory drawing illustrating an example of number assignment to a group robot in an embodiment of the present invention.

FIG. 5 is an explanatory drawing of control form of a collective movement of a group robot in an embodiment of the present invention.

DESCRIPTION OF EMBODIMENTS

A preferred embodiment according to a group robot and a method for controlling a collective movement of a group robot in the present invention will now be described with reference to Figures. In following descriptions, structures with the same sign in different figures are similar structures. Thus, descriptions about such structures may be omitted.

An aspect of the present invention may be embodied in any form as long as a group robot comprising at least two robots that have powers and autonomously move, wherein each of the robots includes a measurement section for obtaining mutual position information among the robots and an object that exists in a movable area of the robots, a communication section for exchanging the information among the robots, a control section for moving the robot on the basis of the information, wherein the control section presets a virtual object temperature for the object and a virtual initial robot temperature that is lower than the virtual object temperature for the robot, calculates a virtual robot temperature, which changed by a virtual heat transfer, from the virtual object temperature, the virtual initial robot temperature, and a distance between the robot and the object, calculates virtual attractive-repulsive force from a distance between the robots to keep the distance between the robots and virtual repulsive force acting between the object and the robot from a virtual robot temperature by using a thermodynamics mathematical model, and controls a movement direction and velocity of the robot by using a sum of the virtual attractive-repulsive force and the virtual repulsive force.

For example, a robot disclosed in a nonpatent literature 1 can be used.

Also, a robot that moves on ground will be described below. However, description can be applied to a group robot that moves in water, air, cosmic space, or the like.

Firstly, mathematical models of thermodynamics in a group robot of the present invention will be described on the basis of FIG. 1 and FIG. 2.

Mathematical models applied to the present invention are (1) an energy model considering attractive force and repulsive force between robots and between an obstacle and a robot, (2) a heat transfer model considering heat exchange between a robot and an obstacle, and (3) a phase transition model considering a phase transition that a robot and an obstacle change to a same phase based on a heat condition. These models will be described in the order described above.

(Application of Energy Model)

Figure 1:
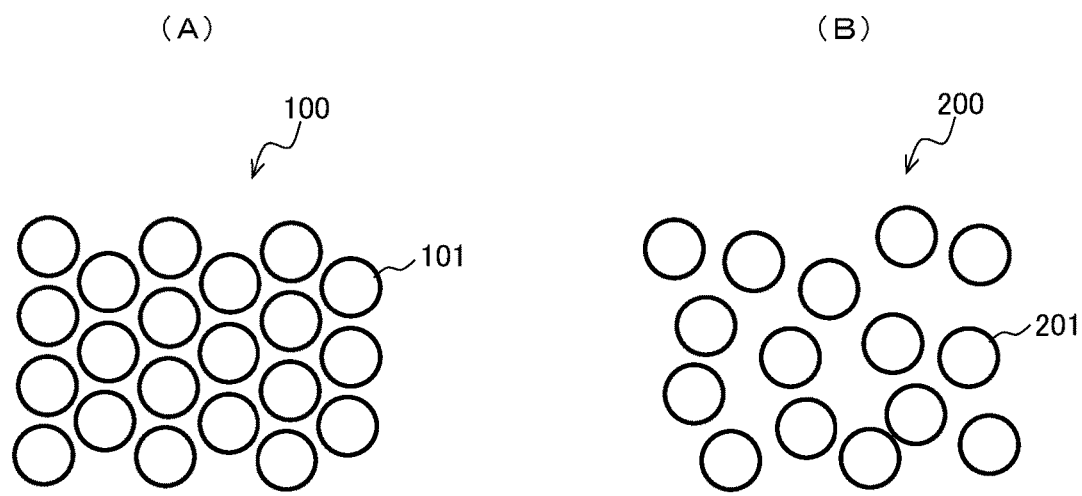
FIG. 1 is an explanatory drawing illustrating states of group robots in an embodiment of the present invention.

FIG. 1 is an explanatory drawing illustrating states of group robots in an embodiment of the present invention. FIG. 2 is an explanatory drawing illustrating an example of a thermodynamics mathematical model in an embodiment of the present invention.

In the present invention, a robot is regarded as a molecule to apply an energy model of a thermodynamics mathematical model.

As shown in the above-mentioned formula (7), energy that each molecule potentially has is a sum of potential $\phi(r)$ acting between molecules (Lennard-Jones potential) and heat energy $K(T)$ transferred from outside (Brownian motion). The potential $\phi(r)$ acting between molecules works as attraction-repellant force, and the heat energy $K(T)$ transferred from outside works as repulsive force. Because this potential gathers each molecule to form a group and works as attractive force or repulsive force to keep a constant distance between molecules, the term "attractive-repulsive force" is used here.

According to thermodynamics, a substance maintains a constant state only in a limited range of temperature and pressure. And the substance becomes a solid phase, a liquid phase, or a gaseous phase according to that range. In other words, as the temperature and pressure change, a phase transition from a solid phase to a liquid phase or from a liquid phase to a gaseous phase occurs in a substance.

The solid phase, the liquid phase, and the gaseous phase have the same composition and property in each phase. The number of molecules in a certain volume of each phase reduces in the order of the solid phase, the liquid phase, and the gaseous phase. As the number of molecules reduces, the degree of freedom in molecular motion increases.

FIG. 1 illustrates states of group robots 100 and 200 that are formed by a plurality of robots 101 and 201 respectively regarded as molecules (A) in a solid phase and (B) in a liquid phase. (A) In case of the solid phase, the state can be described as a state in that distances between robots 101 (between molecules) are constant because the potential $\phi(r)$ acting between robots 101 (between molecules) (Lennard-Jones potential), which is indicated in the formula (7), is large ($\phi(r) \gg K(T)$). In this state, the group robot 100 is an assembly of robots 101 with strong connection.

(B) In case of the liquid phase, the state can be described as a state in that distances between robots 201 (between molecules) are different because both of the potential $\phi(r)$ acting between robots 201 (between molecules) (Lennard-Jones potential) and the heat energy $K(T)$ transferred from outside (Brownian motion) that are indicated in the formula (7) work. In this state, the group robot 200 is an assembly of robots 201 with flexibility.

Thus, the present invention realizes the collective movement that achieves both of strong connection and flexibility by applying the solid phase, the liquid phase, and the phase transition to a collective movement of a group robot.

A mathematical model applied to an embodiment of the present invention will be described with reference to FIG. 2. In FIG. 2, robots 102 and 103, which form a group robot 100, and an obstacle (an object) 500 are arranged. $r_{il}$ is a distance between the obstacle 500 and the robot 102, and $r_{ij}$ is a distance between the robot 102 and the robot 103. The robots 102 and 103 have cylindrical bodies with a diameter a, and the distances start from centers of the robots 102 and 103. However, the shape of the body is not limited to a cylinder.

The obstacle 500 is a virtual heat source with temperature $T_l$. Robots 102 and 103 are initially assigned with temperatures lower than the temperature $T_l$, and the temperature of the robot 102 is set to $T_i$.

The above-mentioned formula (1) is set for the robot 102 as an energy model corresponding to the above-mentioned formula (7). total energy is calculated only by entering observed values of the distance $r_{il}$ between the obstacle 500 and the robot 102, and distance $r_{ij}$ between the robots 102 and 103 into the formula (1).

The formula (1) is a thermodynamics mathematical model expressing total energy. In the formula (1), the attractive-repulsive force is indicated by a first term on the right side, and the repulsive force is indicated by the second term on the right side. Thus, a movement of a robot can be controlled by expressing the virtual intermolecular force and the virtual heat energy by only distances between robots and distances between a robot and the obstacle (an object).

More specifically, the first term on the right side of the formula (1), which indicates the attractive-repulsive force, works to keep a constant distance between the robot 102 and the robot 103 that approaches the robot 102, and the second term works to leave the robot 102 away from the obstacle 500.

An attractive force adjustment parameter β, an attractive force maximum value adjustment parameter ε, a repulsive force strength parameter A, and an attractive force strength parameter B can be arbitrarily adjusted according to the environment of the robot. For example, in case that the distance between the obstacle 500 and the robot 102 should not be close, the temperature Tl of the obstacle 500 can be set to be large.

According to the energy model of this embodiment, relationships between robots are calculated easily to control a movement direction and velocity of each robot. In other words, according to the gratitude of the attractive force and the repulsive force, it is possible to make a robot itself judge whether the robot moves as a group or moves autonomously.

(Application of Heat Transfer Model)

According to the second law of thermodynamics, in case that two objects with different temperatures contact, heat always transfers from an object with higher temperature to an object with lower temperature.

Figure 2:
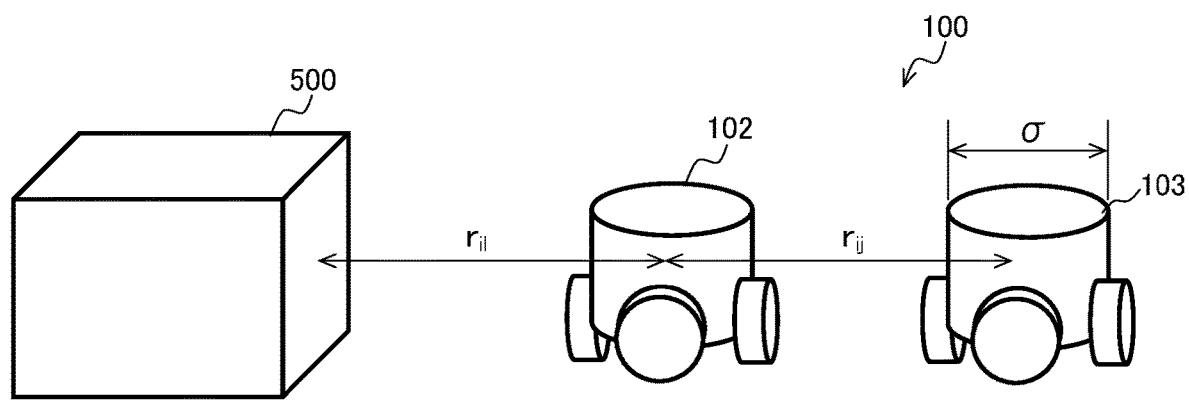
FIG. 2 is an explanatory drawing illustrating an example of a thermodynamics mathematical model in an embodiment of the present invention.

With reference to FIG. 2, as described above, the obstacle 500 is a virtual heat source with temperature $T_l$. Robots 102 and 103 are initially assigned with temperatures lower than the temperature $T_l$, and the temperature of the robot 102 is set to $T_i$.

In this embodiment of the present invention, the above-mentioned formula (2) is set to express a virtual heat transfer from the obstacle 500 to the robots 102 and 103.

In other words, the virtual heat transfer model corresponds to local convection heat transfer by multiplying a time change of a temperature difference between the temperature $T_l$ of the obstacle 500 and the temperature $T_i$ of the robot 102 by a virtual heat transfer coefficient k.

According to this heat transfer model, in case that the temperature difference between the obstacle 500 and the robot 102 is set to be larger, a larger amount of heat transfers and the temperature of the robot 102 increases. Thus, the robot 102 doesn't get too close to the obstacle and it is possible to make the robot 102 avoid the obstacle, and the opposite case also can be performed.

(Application of Phase Transition Model)

The term "phase transition" means that a phase of a substance changes to another phase. In thermodynamics, a phase is defined as assembly of a system with a certain character in a stable state, and composition and property are the same in each phase. For example, a phase in which a substance is gaseous, liquid, or solid is called as a gaseous phase, a liquid phase, or a solid phase, and changing a phase of a substance from gas to liquid or solid, from liquid or solid to gas, or the like is called as a phase transition.

In the solid phase, the liquid phase, and the gaseous phase, the number of molecules in a certain volume of each phase reduces in the order of the solid phase, the liquid phase and the gaseous phase. As the number of molecules reduces, the degree of freedom in molecular motion increases.

According to Gibbs phase rule, free energy of a substance becomes minimum in a heat equilibrium state of a substance. The free energy is indicated in the first term on the right side of the formula (1) and in the first term on the right side of the formula (7), and the free energy is potential ϕ (r) that works as virtual intermolecular force and acts between molecules if the robot is supposed to be a virtual molecule.

Considering a solid phase and a liquid phase, a substance generally becomes a solid phase at a low temperature to be in a stable heat equivalent state and becomes a liquid phase at a high temperature to be in a stable heat equivalent state. A change from a solid phase to a liquid phase or from a liquid phase to a solid phase is a phase transition, and a temperature at which the phase transition occurs is called as phase transition temperature.

If a temperature of a substance in a solid phase exceeds the phase transition temperature, temperature differential of free energy that can be regarded as entropy changes discontinuously. Then phase transition occurs and the substance becomes a liquid phase to absorb heat. Also, if a temperature of a substance in a liquid phase dose not exceed the phase transition temperature, temperature differential of free energy that can be regarded as entropy changes discontinuously. Then phase transition occurs and the substance becomes a solid phase to discharge heat.

In this embodiment of the present invention, this phase transition is expressed by presetting a virtual phase transition temperature to a robot, which is a virtual molecule.

When initial heat transfer from the obstacle 500 to the robot 102 is low and attractive force between robots is strong, robots are in a strongly connected state.

This state expresses a solid phase, and a strongly connected group with a certain formation as a group robot can be formed.

On the other hand, when some robots that form the group robot approach the obstacle and the temperature of them exceeds the virtual phase transition temperature because of exchanging the virtual heat energy, the robot and the obstacle change to a liquid phase. In other words, the robot and the obstacle are defined as assembly of a system with a certain character in a stable state, and the assembly has the same composition and property.

By being a liquid phase, heat quantity transferred from the obstacle to the robot increase. This increases the virtual robot temperature and the heat energy in the second term on right side of the formula (1).

The increased heat energy increases the repulsive force acting between the robot and the obstacle so that the robot avoids the obstacle.

Also, because the attractive force between the robot and surrounding robots relatively decreases, strong connection between robots is weakened. Thus, the group robot has a flexible and various formation according to the environment while moving as a group.

The occurrence of a phase transition of the robot 102 can be judged by formalizing the free energy and the entropy change as described above. However, in this embodiment, the virtual transition temperature is expressed by the ratio of the diameter σ of the robot and the distance $r_{ij}$. And the virtual liquid phase is expressed to have temperature distribution indicated in the formula (3) between the robot and the object.

In other words, in this embodiment, a phase transition occurs when the distance $r_{ij}$ is smaller than the diameter σ. The robot 102 and the obstacle 500 form a virtual liquid phase that has temperature distribution indicated in the formula (3).

On the other hand, when the distance $r_{ij}$ is larger than or equal to the diameter σ, the robot 102 and the obstacle 500 are in heat equilibrium states independent from each other, and the robot 102 and the obstacle 500 don't have temperature distribution that covers the both elements.

As described above, according to this embodiment, a collective movement of a group robot can be realized with a low calculation load by applying a thermodynamics concept of phase transition to a group robot. Furthermore, if an obstacle exists, only a robot that is under influence of the obstacle can avoid the obstacle. Thus, it is possible to achieve an effect in which partial centralized control and partial distributed control can be accordingly and autonomously selected.

Furthermore, in the above-mentioned embodiment, the virtual transition temperature is expressed by a ratio of the diameter 6 of the robot and a distance $r_{ij}$, and the virtual liquid phase has temperature distribution indicated in the formula (3) between the robot and the object. This makes it possible to express a phenomenon of the virtual phase transition by a positional relationship between the robot ant the obstacle so that the group robot can certainly avoid the obstacle.

Figure 3:
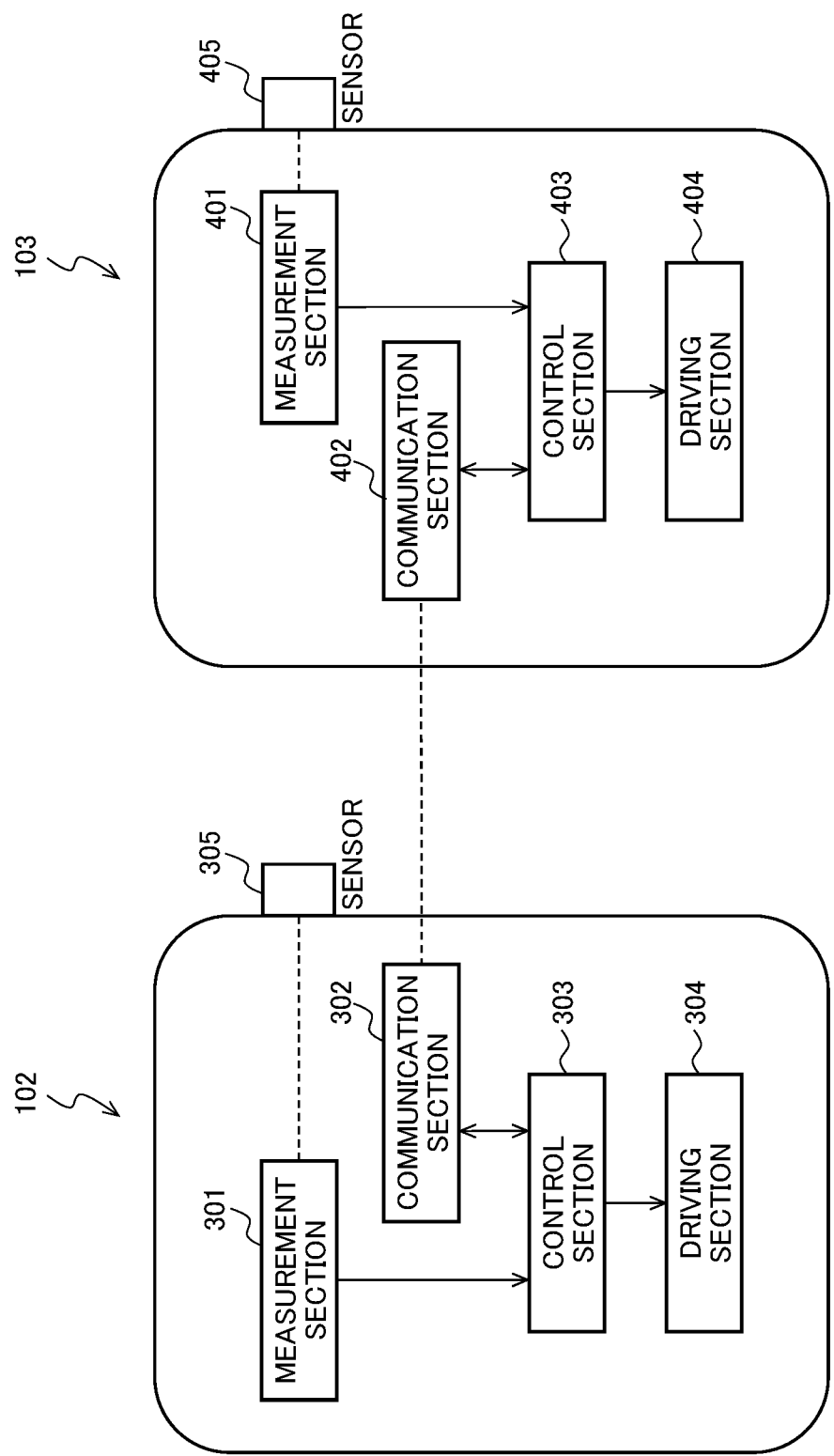
FIG. 3 is a schematic drawing of function block of a group robot in an embodiment of the present invention.

Next, a configuration example of a group robot of the present invention will be described on the basis of FIG. 2 and FIG. 3. FIG. 3 shows a schematic function block of a group robot in an embodiment of the present invention.
(Description of Configuration of Robot)

With reference to FIG. 3, the robots 102 and 103 respectively include measurement sections 301 and 401, communication sections 302 and 402, control sections 303 and 403, driving sections 304 and 404 and sensors 305 and 405.

This block illustrates a configuration per function and does not illustrate a configuration per hardware.

The measurement sections 301 and 302 obtain mutual position information among the robots 102 and 103 and the obstacle 500, which are illustrated in FIG. 2, that exists in a movable are of the robots 102 and 103 by using the sensors 305 and 405.

The sensors 305 and 405 are appropriately selected considering factors of the usage environment of the robots, the condition and the size of the obstacle, required movement performance, and the like.

For example, an infrared sensor, an ultrasonic sensor, a combination of an ordinary communication radio of below-described communication sections 302 and 402 and GPS, an electrolytic sensor, or the like can be used.

An instrument for measuring distance and position by using reflection and an infrared ray light source disclosed in the nonpatent literature 1 can be used.

The communication sections 302 and 402 exchange the mutual position information via wireless communication among the robots 102 and 103 and the obstacle 500 (an object) that exists in a movable are of the robots 102 and 103.

The control sections 303 and 304 calculate a moving direction and a velocity of robots 102 and 103 from the above-mentioned thermodynamics mathematical model by using the mutual position information among the robots 102 and 103 and the obstacle 500 (an object) that exists in a movable are of the robots 102 and 103

The control sections 303 and 403 include a microcomputer that has a processor for calculation; a ROM for storing a list of a control program and various data, a table and a map; and a RAM for temporally storing a calculation result of the processor.

The control sections 303 and 403 include a nonvolatile memory to reserve necessary data of a robot movement for the next time. The nonvolatile memory can include an EEPROM, which is a rewritable ROM, or a RAM with a backup function. The RAM with the backup function is supplied with a holding current to reserve memory even if the power is turned off.

The calculation result of the control sections 303 and 304 can be exchanged between the robots 102 and 103 each other via the communication sections 302 and 402. This makes it possible to precisely control the robot movement of each other.

The driving sections 304 and 404 drive the robots 102 and 103 in designated directions with designated velocity after an instruction from the control sections 303 and 304.

The driving sections 304 and 404 are appropriately selected considering factors of the usage environment of the robots, the condition and the size of the robot, required movement performance, and the like.

For example, if the robots move on ground, a combination of a motor and wheels such as an omni wheel illustrated in FIG. 2, a vibration motor disclosed in the nonpatent literature 1 or the like can be applied. Also, in case of moving in air, a propulsion mechanism for flight such as a drone can be selected, and in case of moving in water, a propulsion mechanism for dive or the like can be selected, Next, a method for controlling a collective movement of a group robot in the present invention will be described on the basis of FIG. 4 to FIG. 6.

Figure 6:
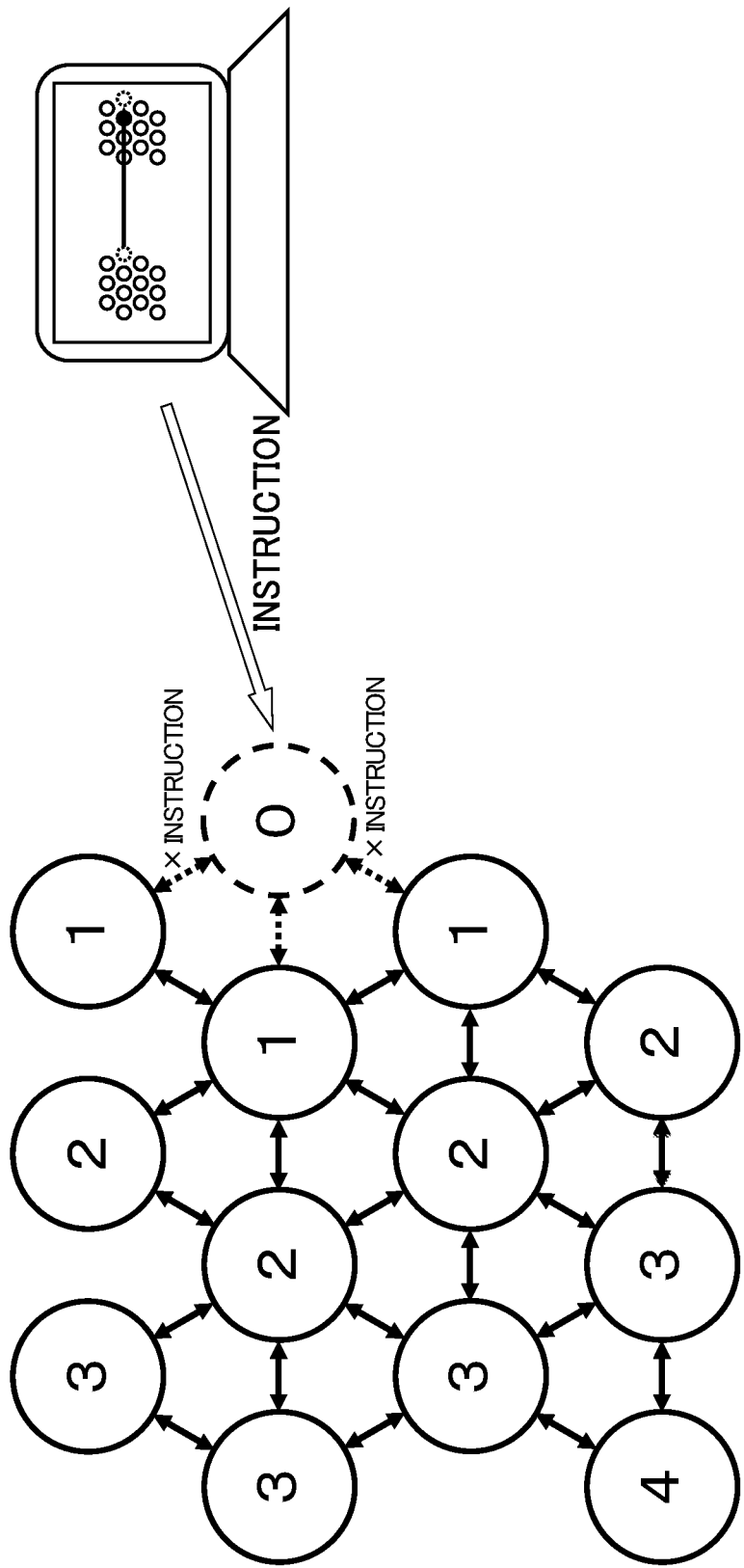
FIG. 6 is an explanatory drawing illustrating an instruction system in an example of collective movement control of a group robot in an embodiment of the present invention.

FIG. 4 is an explanatory drawing illustrating an example of number assignment to a group robot in an embodiment of the present invention. FIG. 5 is an explanatory drawing of control form of a collective movement of a group robot in an embodiment of the present invention. FIG. 6 is an explanatory drawing illustrating an instruction system in an example of collective movement control of a group robot in an embodiment of the present invention.

(Description of Method for Controlling Collective Movement of Group Robot)

With reference to FIG. 4 and FIG. 5, respective circle expresses a robot.

In FIG. 4, a robot written "0" is a leader robot. According to number assignment based on the formula 4, robots in the first surrounding layer from the leader robot 110 are assigned with "1", and robots in outer circumference of robots "1" are assigned with "2".

Information of a destination or a route is set to the leader robot. This information setting may be stored in a memory of the leader robot in advance or may be instructed from outside via the communication sections 302 and 402 illustrated in FIG. 3.

Also, the number "0", which is to be assigned to the leader robot, may be assigned to any robot that forms a group robot.

Furthermore, if the assigned leader robot gets into an unexpected situation and becomes unmovable, a follower robot can be newly assigned as a leader robot. In this case, new number assignment based on the formula (4) is necessary.

With reference to FIG. 5, a centralized network is schematically illustrated in (A), and a distributed network is schematically illustrated in (B). As described above, in the group robot in this embodiment, the distributed network of (B) has already been achieved by applying the thermodynamics mathematical model.

The leader robot assignment and number assignment based on the formula (4) makes it possible to achieve control in the centralized network of (A)

With reference to FIG. 6, instruction including information of a destination or a route is transmitted to the leader robot from outside. If the leader robot moves on the basis of the instruction, follower robots that communicate each other and are assigned with "1" follow the leader robot. Furthermore, follower robots that communicate each other and are assigned with "2" follow the follower robots assigned with "1".

As described above, number assignment is regularly performed to each robot on the basis of the formula (4). This makes it possible to define the instruction system and to control a group robot in a concentrative manner and a distributed manner.

Next, an embodiment of controlling a collective movement of a group robot in the present invention will be described on the basis of FIG. 7 to FIG. 8.

Figure 7:
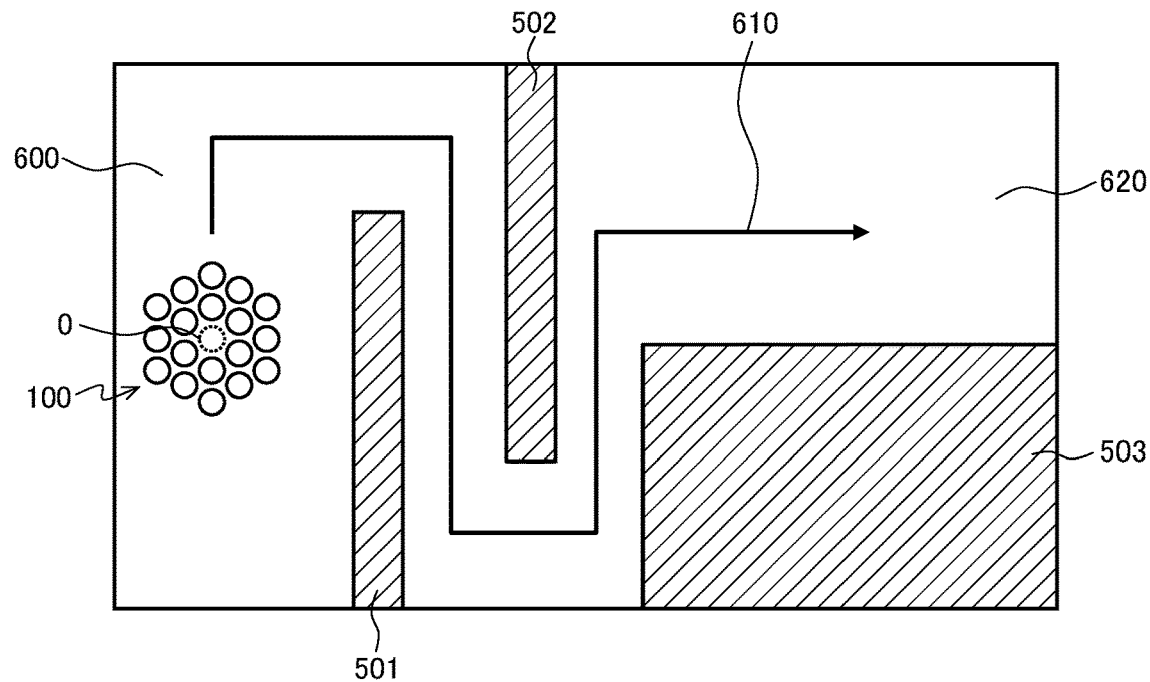
FIG. 7 is an explanatory drawing illustrating an instruction content and a situation in an example of collective movement control of a group robot in an embodiment of the present invention.

FIG. 7 is an explanatory drawing illustrating an instruction content and a situation in an example of collective movement control of a group robot in an embodiment of the present invention. FIG. 8 is an explanatory drawing illustrating a movement situation of a group robot in an example of collective movement control of a group robot in an embodiment of the present invention.

(Embodiment of Collective Movement Control of Group Robot)

In this embodiment, control based on the mathematical model expressed in the formulas (4) to (6) is performed as a calculation simulation. Formulas (5) and (6) express a mutual energy state of the leader robot, which is assigned with a number, and follower robots to realize the distributed control.

FIG. 7 illustrates an instruction content for a group robot 100 that forms a group at a first space 600 of a start point. The group robot 100 is instructed to move on a route 610, avoid obstacles 501, 502, and 503 that exist in a movable area of the group robot 100, and move to a second space 620 of a final destination.

In FIG. 7, the group robot 100 includes a leader robot 0 and other follower robots that aren't assigned with numbers and are expressed with other circles.

Instruction of moving to the final destination, which is the second space 620, along the route 610 is given to the leader robot 0.

Figure 8:
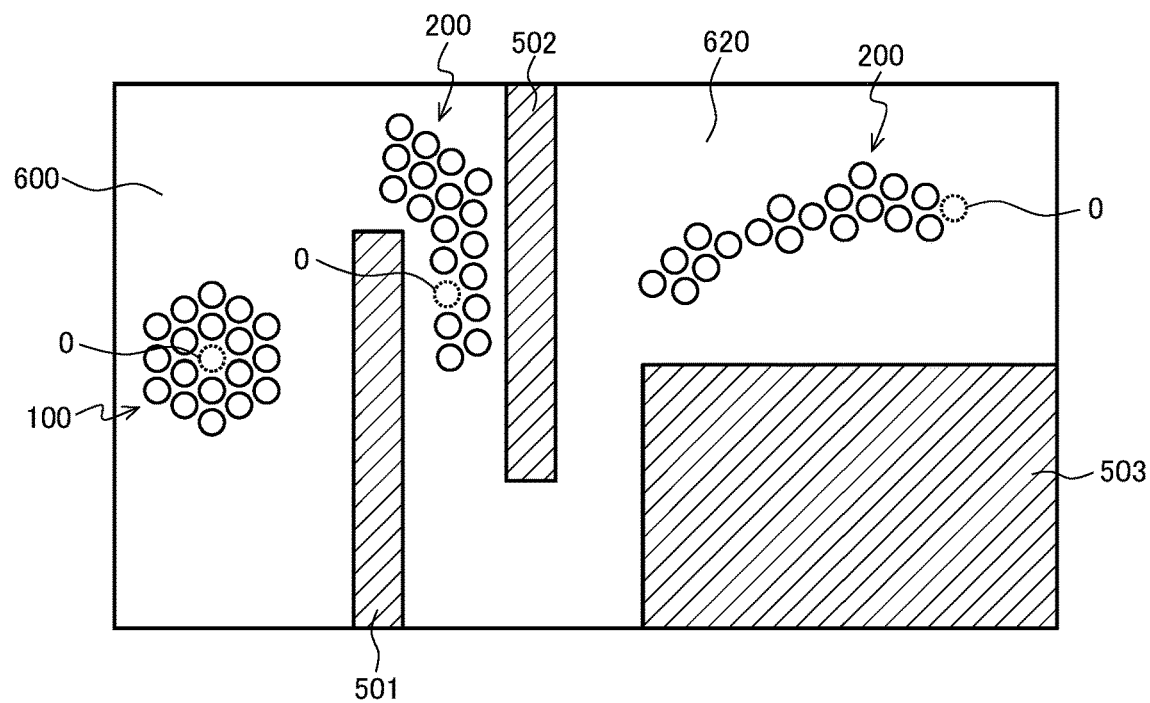
FIG. 8 is an explanatory drawing illustrating a movement situation of a group robot in an example of collective movement control of a group robot in an embodiment of the present invention.

With reference to FIG. 8, the leader robot 0 and the follower robots that follow the leader robot 0 are illustrated. The leader robot 0 and the follower robots in FIG. 8 follow the instruction of FIG. 7.

A route 610 surrounded by the obstacles 501 and 502 is narrower than the first space 600.

If some robots that form the group robot 100 approach the obstacle 501 and 502, a phase transition to a virtual liquid phase occurs in the follower robot on the basis of the formula (3).

If the phase transition occurs and the obstacles 501 and 502 and the follower robot become a virtual liquid phase, the repulsive force of the follower robot to avoid the obstacles 501 and 502 becomes larger than the attractive force between the robots. These repulsive and attractive force are indicated in the formula (1).

As the result, the group robot 100 changes to a group robot such as a group robot 200. In other words, the group robot changes from a group in which strong connection is predominant to a group in which flexibility is predominant. The group robot 200 to which the group robot 100 changed avoids the obstacles 501 and 502 to advance the narrow route surrounded with the obstacles 501 and 502.

The group robot 200 makes the leader robot 0 lead follower robots and avoids the obstacles 502 and 503 to also advance the route 610 surrounded with the obstacles 502 and 503 and reaches the second space 620 of the destination.

In FIG. 8, the group robot 200 that reached the second space 620 is a group in which flexibility is predominant. However, the group robot 200 may be in a centralized state such as the group robot 100 on the basis of number assignment.

According to a method for controlling a collective movement of a group robot that is formed by a plurality of the robots in this embodiment, at least one of the robots that forms the group robot is assigned as one or more leader robots and the one or more other robots are assigned as one or more follower robots, the leader robots and the follower robots can communicate with each other, and an instruction from the leader robots to the follower robots makes the follower robots follow the leader robots. This makes it possible to control the movement of the group robot including follower robots by instructing a destination or a route only to the leader robot. This makes it possible to realize the collective movement of a group robot with a low calculation load.

It is possible to apply a thermodynamics mathematical model to control and to provide a group robot and a method for controlling a collective movement of a group robot that realize a combination of autonomous distributed control and centralized control according to the environment.

Embodiments of the present invention are not limited to the above-mentioned embodiments. For example, a robot disclosed in the nonpatent literature 1 can be applied to a configuration of a robot.

Also, in the above embodiments, a robot that moves on ground was described. However, description can be applied to a group robot that moves in water, air, cosmic space, or the like as well as a robot for various works such as conveying work, exploration of environment, or the like.

REFERENCE SIGNS LIST 0 leader robot
1, 2, 3, 4 follower robot
100, 200 group robot
101, 102, 103, 201 robot
301, 401 measurement section
302, 402 communication section
303, 403 control section
304, 404 driving section
305, 405 sensor
500, 501, 502, 503 obstacle
600 first space
610 route
620 second space

The invention claimed is:

1. A group robot comprising at least two robots that each have powers and autonomously move, wherein
each of the robots
obtains mutual position-information for a robot with respect to other robots within the group and an object that exists in an area within which the robots move, and
exchange information with other robots within the group, each of the robots moves on the basis of the obtained mutual position-information,
each of the robots including a processor and a storage storing a program that causes the processor to:
preset a virtual object temperature for the object and a virtual initial robot temperature that is lower than the virtual object temperature for the robot,
calculate a virtual robot temperature, which changed by a virtual heat transfer, from the virtual object temperature, the virtual initial robot temperature, and a distance between the robot and the object,
calculate virtual attractive-repulsive force from a distance between the robot and other robots within the group to control the robot to maintain the distance between the robot and the other robots of the group and virtual repulsive force acting between the object and the robot from the virtual robot temperature by using a thermodynamics mathematical model, and
control a movement direction and velocity of the robot by using a sum of the virtual attractive-repulsive force and the virtual repulsive force.

2. The group robot according to claim 1, wherein
the robot has a cylindrical body with a diameter $\sigma$,
the sum is expressed by a thermodynamics mathematical model of a formula (1),
the virtual attractive-repulsive force is expressed by a first term on a right side of the formula (1) and the virtual repulsive force is expressed by a second term on the right side of the formula (1)

formula (1)

$$Q_i(r_{ij}, T_i(r_{il}, t)) = \sum_{j \in RS} \beta \varepsilon \left\{ \left(\frac{\sigma}{r_{ij}}\right)^A - \left(\frac{\sigma}{r_{ij}}\right)^B \right\} + \frac{T_i(r_{ij}, t)^2}{2} \quad (1)$$

where:
subscript l is an object, subscript i is an ith robot, subscript j is a jth robot, Q is a sum, r is a distance, t is time, $\beta$ is an attractive-repulsive force adjustment parameter,
$\varepsilon$ is an attractive-repulsive force maximum value adjustment parameter, T is a virtual temperature,
A is a repulsive force strength parameter, B is an attractive force strength parameter, and
RS is an assembly of robots that can exchange information.

3. The group robot according to claim 2, wherein the virtual heat transfer is expressed by a formula (2)

formula (2)

$$T_i(r_{il}, t) = \int_{dt}^{\infty} -k \left\{ T_i(r_{il}, t - dt) - \frac{\sum_{i \in OS} T(r_{il})}{|OS|} \right\} dt + T_0 \quad (2)$$

where:
subscript l is an object, k is a virtual heat transfer coefficient, OS is an assembly of objects that exist in a movable area of a robot, and T0 is a virtual initial robot temperature.

4. The group robot according to claim 2, wherein when the virtual robot temperature exceeds a preset virtual transition temperature, the object and the robot form a virtual liquid phase.

5. The group robot according to claim 4, wherein the virtual transition temperature is expressed by a ratio of the diameter $\sigma$ of the robot and a distance $r_{il}$, and
the virtual liquid phase has temperature distribution indicated in a formula (3) between the robot and the object formula (3)

$$T(r_{il}) = -2\left(\frac{T_i}{\sigma} r_{il} + T_l\right). \quad (3)$$

6. A method for controlling a collective movement of a group robot formed by a plurality of the robots wherein each of the robots
obtaining mutual position information for the robot with respect to other robots within the group and an object that exists in an area within which the robots move, and
exchanging information with other robots within the group, each of the robots moving on the basis of the obtained mutual position information, the method comprising:
presetting a virtual object temperature for the object and a virtual initial robot temperature that is lower than the virtual object temperature for the robot,
calculating a virtual robot temperature, which changed by a virtual heat transfer, from the virtual object temperature, the virtual initial robot temperature, and a distance between the robot and the object,
calculating virtual attractive-repulsive force from a distance between the robot and other robots within the group to control the robot to maintain the distance between the robot and the other robots of the group and virtual repulsive force acting between the object and the robot from the virtual robot temperature by using a thermodynamics mathematical model, and controlling a movement direction and velocity of the robot by using a sum of the virtual attractive-repulsive force and the virtual repulsive force, said method further comprising:

assigning at least one of the robots that forms the group robot as a leader robot and assigning one or more other robots of the group to be follower robots, causing the leader robots and the follower robots to communicate with each other, and causing the follower robots to follow the leader robot by providing an instruction from the leader robot to the follower robots.

7. The method for controlling the collective movement of the group robot according to claim 6, wherein assigning each of the robots with an identification number N, each leader robot being assigned 0 as an identification number N, assigning a plurality of the follower robots with numbers that are calculated according to a formula (4) as the identification number N of each, with the assigned identification number N, being determined by a thermodynamics mathematical model expressing the sum of the follower robots is expressed by formulas (5) and (6)

formula (4)

$$N_i = \min(N_j | j \in RS) + 1 \qquad (4)$$

formula (5)

$$Q'_i(r_{ij}, T_i(r_{il}, t), \delta(N_i, N_j)) = \qquad (5)$$

$$\sum_{j \in RS} \delta(N_i, N_j) \beta \varepsilon \left\{ \left(\frac{\sigma}{r_{ij}}\right)^A - \left(\frac{\sigma}{r_{ij}}\right)^B \right\} + \frac{T_i(r_{ij}, t)^2}{2}$$

formula (6)

$$\delta(N_i, N_j) = \begin{cases} P_r; & N_i = N_j + 1 \\ 1; & N_i = N_j \quad ; \quad P_r \geq 1 \geq P_w > 0. \\ P_w; & \text{else} \end{cases} \qquad (6)$$

8. The method of claim 6 wherein the robot has a cylindrical body with a diameter $\sigma$, the sum is expressed by a thermodynamics mathematical model of a formula (1), the virtual attractive-repulsive force is expressed by a first term on a right side of the formula (1) and the virtual repulsive force is expressed by a second term on the right side of the formula (1)

formula (1)

$$Q_i(r_{ij}, T_i(r_{il}, t)) = \sum_{j \in RS} \beta \varepsilon \left\{ \left(\frac{\sigma}{r_{ij}}\right)^A - \left(\frac{\sigma}{r_{ij}}\right)^B \right\} + \frac{T_i(r_{ij}, t)^2}{2} \qquad (1)$$

where:

subscript l is an object, subscript i is an ith robot, subscript j is a jth robot, Q is a sum, r is a distance, t is time, $\beta$ is an attractive-repulsive force adjustment parameter, $\varepsilon$ is an attractive-repulsive force maximum value adjustment parameter, T is a virtual temperature, A is a repulsive force strength parameter, B is an attractive force strength parameter, and RS is an assembly of robots that can exchange information.

9. The method of claim 8, wherein the virtual heat transfer is expressed by a formula (2)

formula (2)

$$T_i(r_{il}, t) = \int_{dt}^{\infty} -k \left\{ T_i(r_{il}, t - dt) - \frac{\sum_{l \in OS} T(r_{il})}{|OS|} \right\} dt + T_0 \qquad (2)$$

where:

subscript l is an object, k is a virtual heat transfer coefficient, OS is an assembly of objects that exist in a movable area of a robot, and T0 is a virtual initial robot temperature.

10. The method of claim 8 wherein when the virtual robot temperature exceeds a preset virtual transition temperature, the object and the robot form a virtual liquid phase.

11. The method of claim 10 wherein the virtual transition temperature is expressed by a ratio of the diameter $\sigma$ of the robot and a distance $r_{il}$, and the virtual liquid phase has temperature distribution indicated in a formula (3) between the robot and the object formula (3)

$$T(r_{il}) = -2\left(\frac{T_i}{\sigma} r_{il} + T_l\right). \qquad (3)$$

\* \* \* \* \*